US008127031B2

(12) United States Patent
Oya

(10) Patent No.: US 8,127,031 B2
(45) Date of Patent: Feb. 28, 2012

(54) IMAGE PROCESSING APPARATUS AND METHOD OF ACQUIRING INFORMATION

(75) Inventor: Takeshi Oya, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 730 days.

(21) Appl. No.: 11/531,115

(22) Filed: Sep. 12, 2006

(65) Prior Publication Data

US 2007/0079006 A1 Apr. 5, 2007

(30) Foreign Application Priority Data

Sep. 30, 2005 (JP) .................................. 2005-287592

(51) Int. Cl.
*G06F 15/16* (2006.01)
(52) U.S. Cl. ........................................ 709/229; 709/232
(58) Field of Classification Search .................. 709/212, 709/216, 217, 219, 229, 232
See application file for complete search history.

(56) References Cited

U.S. PATENT DOCUMENTS

| 6,799,223 | B1 * | 9/2004 | Yamamoto | 709/250 |
|---|---|---|---|---|
| 6,954,795 | B2 * | 10/2005 | Takao et al. | 709/231 |
| 7,057,754 | B1 | 6/2006 | Tsuchiya et al. | |
| 7,444,370 | B2 * | 10/2008 | Shima et al. | 709/203 |
| 7,471,410 | B2 * | 12/2008 | Sato et al. | 358/1.15 |
| 7,480,729 | B2 * | 1/2009 | Fujihara | 709/232 |
| 7,518,614 | B2 * | 4/2009 | Emerson et al. | 345/502 |
| 7,518,743 | B2 * | 4/2009 | Hara | 358/1.15 |
| 7,519,651 | B2 * | 4/2009 | Ehara | 709/201 |
| 7,698,404 | B2 * | 4/2010 | Sugimoto | 709/223 |
| 7,755,779 | B2 * | 7/2010 | Miura et al. | 358/1.13 |
| 2002/0134268 | A1 * | 9/2002 | Yamada | 101/484 |
| 2006/0031186 | A1 | 2/2006 | Yokokura | |
| 2006/0187480 | A1 | 8/2006 | Tsuchiya et al. | |
| 2006/0265473 | A1 * | 11/2006 | Muto | 709/218 |
| 2007/0038877 | A1 * | 2/2007 | Cheshire | 713/300 |

FOREIGN PATENT DOCUMENTS

| JP | 2001-180083 A | 7/2001 |
|---|---|---|
| JP | 2004-318244 A | 11/2004 |
| JP | 2004-334793 A | 11/2004 |
| JP | 2004-355501 A | 12/2004 |
| JP | 2005-055982 A | 3/2005 |
| JP | 2005-269094 A | 9/2005 |

* cited by examiner

*Primary Examiner* — David Lazaro
*Assistant Examiner* — Marie Georges Henry
(74) *Attorney, Agent, or Firm* — Canon USA Inc IP Division

(57) ABSTRACT

An information processing apparatus is communicatable with an image forming apparatus. The information processing apparatus includes a request unit configured to request information about the image forming apparatus to the image forming apparatus, a setting unit configured to set proxy response device identification information to identify an proxy response device to make a response to notify the information about the image forming apparatus, and an acquisition unit configured to acquire the information about the image forming apparatus from the proxy response device identified by the proxy response device identification information, in a case where a response from the image forming apparatus corresponding to the request from the request unit is not received.

11 Claims, 13 Drawing Sheets

FIG.4

| SIZE (OCTET) | 6 | 6 | 2 | 6 | 96 | n | 4 |
|---|---|---|---|---|---|---|---|
| CONTENTS | DESTINATION ADDRESS | SENDER ADDRESS | TYPE | FFFFFFFFFFFF | START-UP PRINTER ADDRESS ×16 TIMES | misc | FCS |
| | 701 | 702 | 703 | 704 | 705 | 707 | 706 |

FIG.6

| Ethernet Header DESTINATION | ff:ff:ff:ff:ff:ff |
|---|---|
| Ethernet Header SENDER | 000085000002 |
| Protocol Type | 800 |
| IPVersion | 4 |
| Header Length | 5 |
| . . . | 0 |
| IP Header DESTINATION | 255.255.255.255 |
| IP Header SENDER | 192.168.10.1 |
| DATA TYPE | 00 (PROXY RESPONSE SEARCH) |
| IMAGE FORMING DEVICE ID | 192.168.10.1 |
| PROXY RESPONSE DEVICE ID | 0.0.0.0 |

FIG.7

| Ethernet Header DESTINATION | 000085000002 |
|---|---|
| Ethernet Header SENDER | 000085000001 |
| Protocol Type | 800 |
| IPVersion | 4 |
| Header Length | 5 |
| ... | 0 |
| IP DESTINATION | 192.168.10.1 |
| IP SENDER | 192.168.11.1 |
| DATA TYPE | 01 (PROXY RESPONSE SEARCH RESPONSE) |
| IMAGE FORMING DEVICE ID | 192.168.10.1 |
| PROXY RESPONSE DEVICE ID | 192.168.11.1 |

FIG.9

| | |
|---|---|
| Ethernet Header DESTINATION | 000085000001 |
| Ethernet Header SENDER | 000085000002 |
| Protocol Type | 800 |
| IPVersion | 4 |
| Header Length | 5 |
| . . . | 0 |
| IP Header DESTINATION | 192.168.11.1 |
| IP Header SENDER | 192.168.10.1 |
| DATA TYPE | 10 (STATUS NOTIFICATION) |
| IMAGE FORMING DEVICE ID | 192.168.10.1 |
| TOTAL NUMBER OF PRINTED SHEETS | 212323 |
| TODAY'S NUMBER OF PRINTED SHEETS | 212 |
| TIME | 2004/12/09 14:00:12 |
| NUMBER OF STATUSES | 3 |
| STATUS | 30001 (TONER LOW) |
| STATUS | 30102 (SECOND CASSETTE NO PAPER) |
| STATUS | 50207 (JAM, REVERSE UNIT) |

FIG.11

| | |
|---|---|
| Ethernet Header DESTINATION | 000085000003 |
| Ethernet Header SENDER | 000085000002 |
| Protocol Type | 800 |
| IPVersion | 4 |
| Header Length | 5 |
| . . . | 0 |
| IP Header DESTINATION | 192.168.11.2 |
| IP Header SENDER | 192.168.10.1 |
| DATA TYPE | 11 (STATUS RESPONSE) |
| IMAGE FORMING DEVICE ID | 192.168.10.1 |
| PROXY RESPONSE DEVICE ID | 192.168.11.1 |
| TOTAL NUMBER OF PRINTED SHEETS | 212323 |
| TODAY'S NUMBER OF PRINTED SHEETS | 212 |
| TIME | 2004/12/09 14:02:13 |
| NUMBER OF STATUSES | 3 |
| STATUS | 30001 (TONER LOW) |
| STATUS | 30102 (SECOND CASSETTE NO PAPER) |
| STATUS | 50207 (JAM, REVERSE UNIT) |

IMAGE PROCESSING APPARATUS AND METHOD OF ACQUIRING INFORMATION

BACKGROUND OF THE INVENTION

1. Field of the Invention

The present invention relates to a method for acquiring information about an image forming apparatus.

2. Description of the Related Art

Conventionally, in image forming devices, techniques for reducing consumption of electric power of an image forming device have been known, in which a power source supplying power to a printer engine is shut off when input of printing data is not detected for a predetermined time.

In recent years, power-saving feature of image forming device is further improved and one example is discussed in Japanese Patent Application Laid-Open No. 2001-180083.

Specifically, in Japanese Patent Application Laid-Open No. 2001-180083, an image forming apparatus is configured to save power by stopping supply of a clock signal to the CPU if a communication I/F (e.g., Ethernet) in which it is difficult to perform handshake operation between a sender and a receiver, is connected. On the other hand, power can be saved by stopping supply of power source if a communication I/F (e.g., USB) which can perform the handshake operations between the sender and receiver, is connected.

However, according to Japanese Patent Application Laid-Open No. 2001-180083, since the power-saving is overemphasized, the image forming apparatus can have difficulty in sufficiently responding to a status request or the like from an external device such as a host computer. On the contrary, if more emphasis is placed in providing sufficient response to the status request, it may be difficult to improve the power-saving.

SUMMARY OF THE INVENTION

According to an aspect of the present invention, at least one embodiment is directed to an information processing apparatus communicable with an image forming apparatus. The information processing apparatus includes a request unit configured to request information about the image forming apparatus to the image forming apparatus, a setting unit configured to set proxy response device identification information to identify a proxy response device which makes a response to notify the information about the image forming apparatus, and an acquisition unit configured to acquire the information about the image forming apparatus from the proxy response device identified by the proxy response device identification information in a case where a response from the image forming apparatus corresponding to the request from the request unit is not received.

According to another aspect of the present invention, at least one embodiment is directed to an information acquisition method of acquiring information about an image forming apparatus by an information processing apparatus. The method includes requesting information about the image forming apparatus to the image forming apparatus, setting proxy response device identification information to identify a proxy response device which makes a response to notify the information about the image forming apparatus, and acquiring the information about the image forming apparatus from the proxy response device identified by the proxy response device identification information in a case where a response from the image forming apparatus corresponding to the request is not received.

Further embodiments, aspects and features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate numerous exemplary embodiments, features and aspects of the invention and, together with the description, serve to explain the principles of the invention.

FIG. 4 illustrates print contents of a magic packet according to an exemplary embodiment of the present invention.

FIG. 6 illustrates contents of a search network packet according to an exemplary embodiment of the present invention.

FIG. 7 illustrates contents of a response network packet according to an exemplary embodiment of the present invention.

FIG. 9 illustrates contents of a packet indicating a first operation status according to an exemplary embodiment of the present invention.

FIG. 11 illustrates contents of a packet indicating a second operation status according to an exemplary embodiment of the present invention.

DETAILED DESCRIPTION OF THE EMBODIMENTS

Exemplary embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

Figure 1:
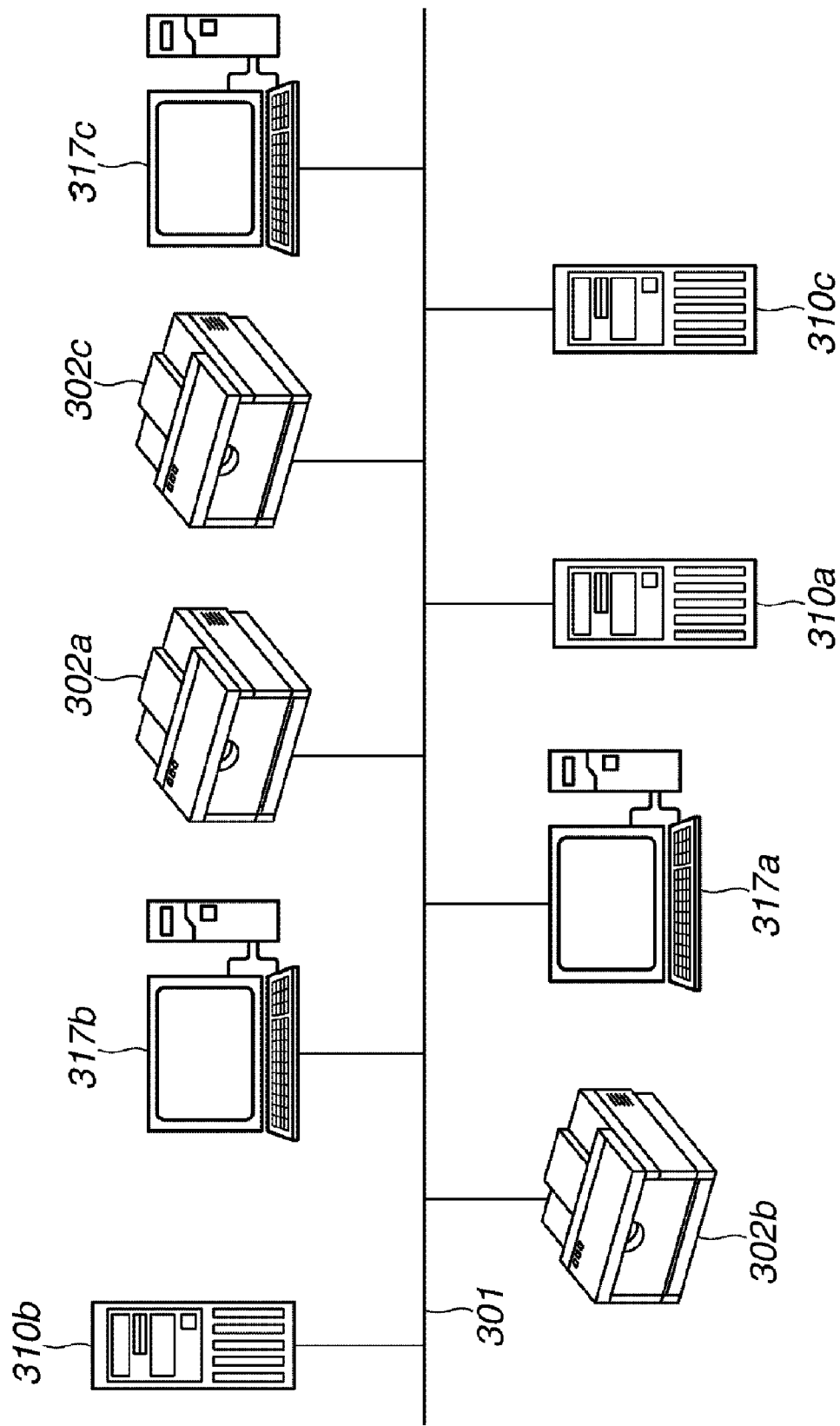
FIG. 1 illustrates a configuration of an image forming system according to an exemplary embodiment of the present invention.

FIG. 1 illustrates a configuration of an image forming system according to an exemplary embodiment of the present invention. In FIG. 1, the image forming system includes a network 301, printers 302a to 302c as an example of image forming devices, proxy server computers 310a to 310c, and host computers 317a to 317c. The printers 302a to 302c, the proxy server computers 310a to 310c, and the host computers 317a to 317c are connected to the network 301 and can communicate with each other via the network 301.

The network 301 is realized, for example, by the Internet or a LAN (Local Area Network). Further, wired and wireless systems can both be applied to the network 301. That is, if the printers 302a to 302c, the proxy server computers 310a to 310c, and the host computers 317a to 317c are communicatably connected each other, various communication networks can be applied thereto. In FIG. 1, three models of printers 302a to 302c, the proxy server computers 310a to 310c, and the host computers 317a to 317c are shown respectively. However, the number of the printers 302a to 302c, the proxy server computers 310a to 310c, and the host computers 317a to 317c are not limited to three, but any number more than one can be applied to the network. Further, as a printer, various types of image forming devices such as an electrophotographic type, an inkjet type, a thermoelectric type can be used.

The printers 302a to 302c have a power-saving mode as described below, and can be in a deep sleep state. If the printers 302a to 302c are in the power-saving mode, they may not respond to a request to acquire an operation status issued from the host computers 317a to 317c. Accordingly, in this embodiment, the proxy server computers 310a to 310c respond to the request to acquire an operation status issued from the host computers 317a to 317c, serving as proxy for the printers 302a to 302c.

The printers 302a to 302c, the proxy server computers 310a to 310c, and the host computers 317a to 317c are described below. Each of the printers 302a to 302c has a similar configuration. Each of the proxy server computers 310a to 310c and each of the host computers 317a to 317c has also a similar configuration. Accordingly, hereinafter, the printers 302a to 302c are represented as a printer 302. Similarly, the proxy server computers 310a to 310c are represented as a proxy server computer 310, and the host computers 317a to 317c as a host computer 317.

Figure 2:
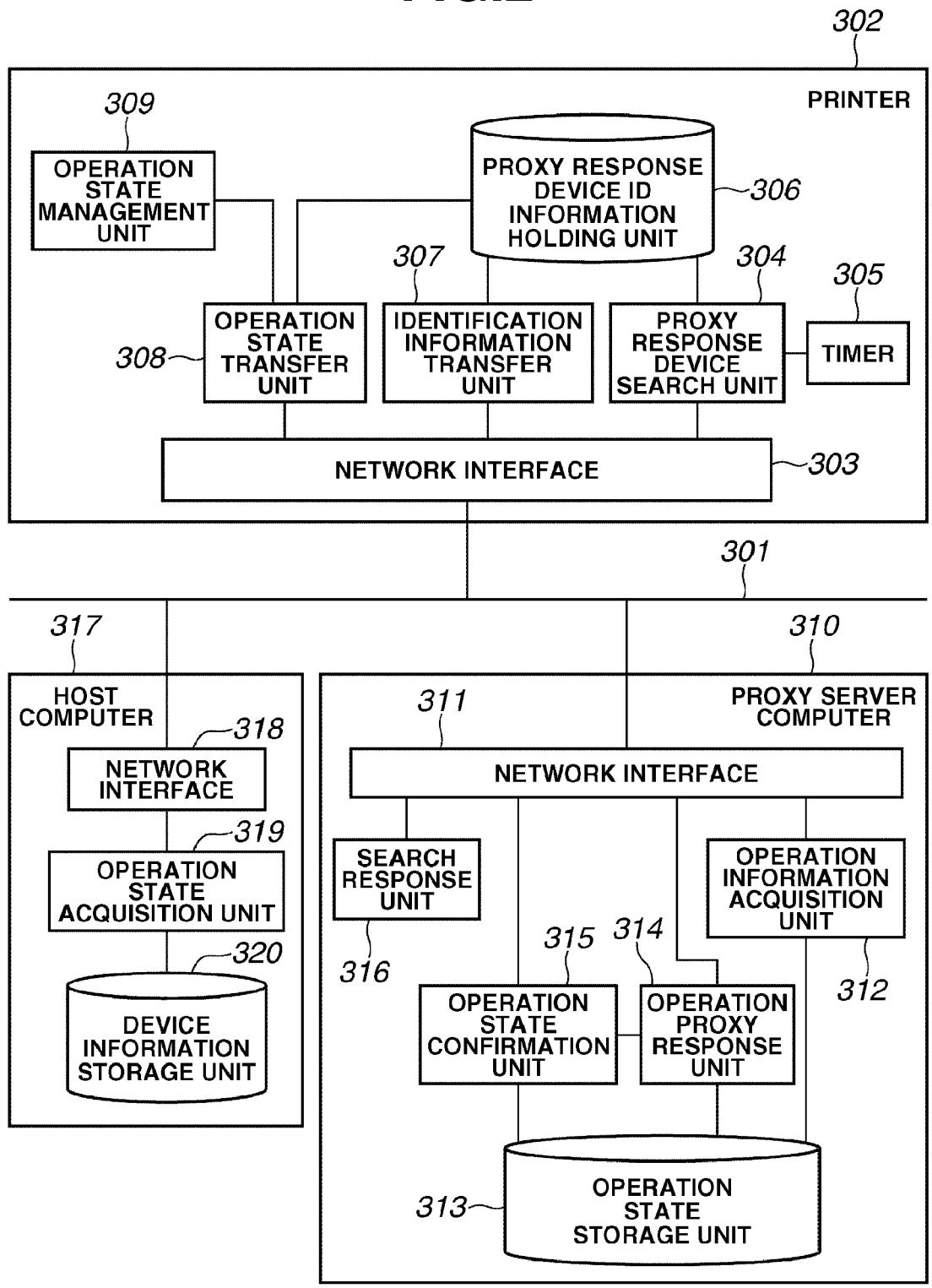
FIG. 2 is a block diagram illustrating a schematic configuration of a printer, a proxy server computer, and a host computer according to an exemplary embodiment of the present invention.

FIG. 2 is a block diagram illustrating an exemplary functional configuration of the printer 302, the proxy server computer 310, and the host computer 317. The functions shown in each block are realized when a CPU (Central Processing Unit) of each device executes a program stored in a nonvolatile storage unit (HDD or ROM). In order to realize each function shown in each block, a part of the functions can be executed by a dedicated hardware while the rest of the functions can be executed in accordance with a software program. In FIG. 2, the printer 302 includes a network interface 303, a proxy response device search unit 304, a timer 305, and a proxy response device ID information holding unit 306. Further, an identification information transfer unit 307, an operation state transfer unit 308, and an operation state management unit 309 are included.

The network interface 303 is used when the printer 302 communicates with other devices (for example, the proxy server computer 310 or the host computer 317) connected to the network 301. The proxy response device search unit 304 searches for or acquires information about the proxy server computer 310 which can make a response by proxy for the printer 302, from a device on the network. The timer 305 counts time in order to start the proxy response device search unit 304 at regular intervals.

The proxy response device ID holding unit 306 holds information which enables to identify the proxy server computer 310 which makes a response by proxy for the printer 302 on the network 301. In the description below, the above information is referred to as a proxy response device ID. Further, the information can also be referred to as proxy response device identification information. The identification information transfer unit 307 notifies the proxy response device ID held in the proxy response device ID holding unit 306 to other computers (for example, the host computer 317) connected to the network 301. The operation state management unit 309 manages an operation status of the printer 302. As examples of the operation status of the printer 302, a remaining amount of consumable material such as toner or paper, failure such as paper jam, and a remaining amount of memory in the printer 302 can be considered. Further, a number of jobs, job names, job sizes registered in a print queue of the printer 302 and a job processing status of the printer 302 are included in the operation status according to this embodiment. Further, as the operation status, static information such as device names, model names, and equipment installation status of the printer 302 can be considered. The operation state transfer unit 308 notifies a packet which indicates an operation status of the printer 302, to other computers (for example, the proxy server computer 310 or the host computer 317) connected to the network 301.

The proxy server computer 310 includes a network interface 311, an operation information acquisition unit 312, an operation state storage unit 313, an operation proxy response unit 314, an operation state confirmation unit 315 and a search response unit 316.

The network interface 311 is used to communicate with other devices (the printer 302 or the host computer 317) connected to the network 301. The search response unit 316 responds to a search of the proxy response device search unit 304 which is included in the printer 302. The operation information acquisition unit 312 receives the information about the operation status of the printer 302 transferred from the operation state transfer unit 308 which is included in the printer 302 via the network interface 311.

The operation state storage unit 313 stores the information about the operation status of the printer 302 acquired by the operation information acquisition unit 312. The operation state confirmation unit 315 queries about an operation status to the printer 302 when acquisition of an operation status of the printer 302 is requested from other devices (for example, the host computer 317) connected to the network 301.

The operation proxy response unit 314 determines whether acquisition of operation status of the printer 302 is requested from other devices (for example, the host computer 317) connected to the network 301. If it is determined that the request exists, the operation proxy response unit 314 obtains the corresponding information about the operation status of the printer 302 from the operation state storage unit 313, sends the information as a response to the device which issued the request (for example, the host computer 317). Thus, the host computer can acquire information of the printer 302.

The host computer 317 includes a network interface 318, an operation state acquisition unit 319, and a device information storage unit 320. The network interface 318 is used to communicate with other devices (for example, the printer 302 or the proxy server computer 310) connected to the network 301.

The operation state acquisition unit 319 acquires information about an operation status of the printer 302. The device information storage unit 320 stores the information about the operation status of the printer 302 acquired by the operation state acquisition unit 319, or a proxy response device ID.

Figure 3:
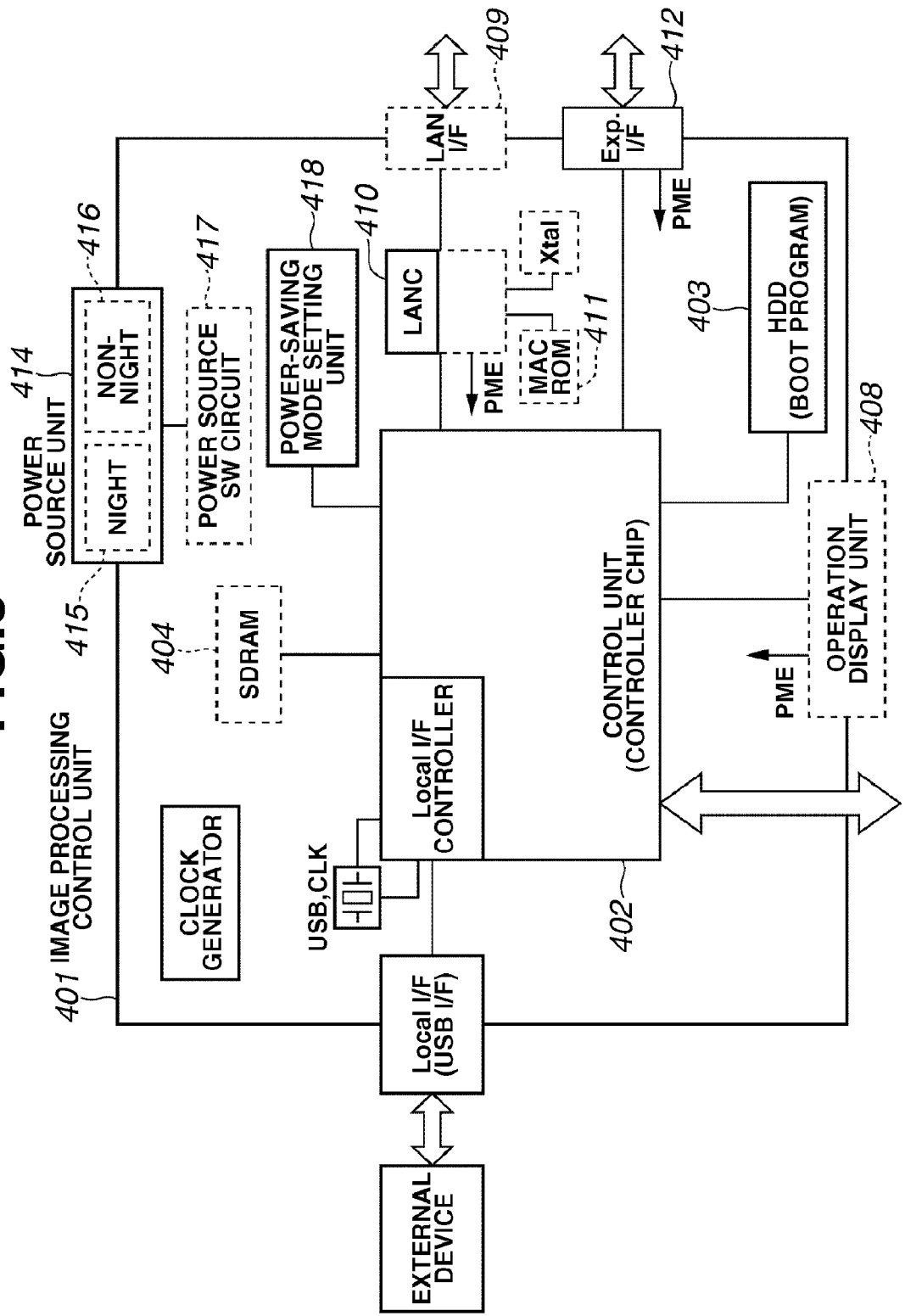
FIG. 3 illustrates a hardware configuration of a controller unit which realizes a function included in a printer according to an exemplary embodiment of the present invention.

FIG. 3 illustrates an exemplary hardware configuration of a controller unit which realizes functions of the above-described printer 302. Especially, the printer 302 according to this embodiment, even in a deep sleep state which is described below, can return to a state in which electric power is supplied, if possible, so that the printer 302 can respond to various requests from external devices.

In FIG. 3, an image processing control unit 401 corresponds to a controller unit in an image forming device, and has a control unit (controller chip) 402 which is integrated in one chip. The control unit 402 can include a ROM interface in which various programs (not shown) are stored, a RAM (including DRAM) interface, a PCI bus interface, a video interface function, expansion hardware of a print description language transferred from an external device, an ASIC (Application Specific Integrated Circuit) which includes compression and expansion functions of various data.

Further, the control unit 402 has a function to carry out image processing of printing data received from an external device via the network 301 and a LAN controller (LANCE) 410 and a function to receive data via the LAN controller 410 and process the received data.

A hard disk (HDD) 403 is a nonvolatile storage medium which retains data even if a main power source is not turned on. In the hard disk 403, for example, an initialization program to each part of the image processing control unit 401, initial setting values (parameters) which relate to image processing, communication, display, or the like, a program which defines various operation such as image processing, communication, display, and a BOOT program for starting the printer 302, are stored. In this embodiment, data which relates to initialization stored in the hard disk 403, is referred to as initialization data or setting data.

When a master electrical switch of the printer 302 is turned on, the BOOT program stored on the hard disk 403 is executed. Then, from the hard disk 403, the initialization program, the initialization values (parameters), the main program, or the like are read by each part of the image processing control unit 401 including the control unit 402, and the initialization processing is executed.

A SDRAM 404 temporarily stores printing data expanded by the control unit 402. When the printer 302 shifts to the deep sleep state which is described below, the SDRAM 404 temporarily saves the initialization data and setting data read from the hard disk 403 at the time of initialization processing. The saved initialization data and setting data are used again by each part when the printer 302 returns from the deep sleep state, and enable high-speed return when power is supplied again to each part. Instead of the SDRAM 404, a DDR-SDRAM or a SRAM can be used. Generally, as compared with nonvolatile storage media such as a hard disk, an EEPROM, or a flash memory, volatile storage media are higher in speed to read and write data. Accordingly, it is preferable to allot this part to the volatile storage medium. Especially, if a data size of a program is large, since data size of the ROM is limited, the program has to be stored in the hard disk 403. In such a case, it is significantly effective to use the volatile storage medium in this part to speed up the read and write of the data.

Now, the deep sleep state according to this embodiment is described. The image processing control unit 401 performs control to supply electric power to each block in the image processing control unit 401 if an interrupting signal is not detected for a predetermined time after the timer is started. More specifically, all-night power sources are supplied from a power source unit 414 to the SDRAM 404, the operation display unit 408, an expansion interface (Exp. I/F) 412, the LAN controller 410, and a network interface (LAN I/F) 409. The expansion interface (Exp. I/F) 412, the network interface (LAN I/F) 409, and the USB I/F shown in FIG. 3 correspond to the network interface 303 in FIG. 2. Further, the all-night power source is also supplied from the power source unit 414 to parts absolutely required to return from the state in which it is not possible to respond to reception and processing of printing data or a status request from an external device such as a power source switch circuit 417. Further, the image processing control unit 401 performs control to shut off power supply to functional blocks other than the blocks to which the all-night power sources are supplied. Power-saving mode setting unit 418 holds a setting of whether to shift to DEEP SLEEP MODE.

To the operation display unit 408, an all-night power source 415 is applied, and users can check a status of the printer 302 including the image processing control unit 401 or change setting relating to various image processing. In response to operation performed to the operation display unit 408, a start signal (in FIG. 3, PME) is issued which returns the image processing control unit 401 from the deep sleep state. Its detailed description is described below. The PME is abbreviated expressions of Power Management Event, and used to instruct to turn on a power source of a system. The PME can be received by systems which mount a bus configured in conformity with PCI 2.2 standard. However, in the present invention, the start signal is not limited to the PME, a unique instruction signal or other instruction signals can be applied if the signal can instruct to turn on a power source.

The network interface (LAN I/F) 409 carries out various data communications with a plurality of external devices (e.g., the host computer 317 or the proxy server computer 310), for example, a 10/100 BASE-T connector can be used for that purpose. The LAN controller (LANCE) 410 controls communications with an external device via the network interface (LAN I/F) 409. The LAN controller 410 has a part (part lined by dotted-line) where electric power is supplied from the all-night power source 415, and a part (part not lined by dotted line) where electric power is supplied from a non all-night power source 416.

The part of the LAN controller 410 lined by dotted line functions as a monitor part which monitors whether any pattern data (e.g., a magic packet shown in FIG. 4) is received out of a plurality of patterns, in response to a query from an external device issued via the network interface (LAN I/F) 409. If the monitor part notices any pattern recognition, the start signal is issued to return the control unit 402 from the deep sleep state. The magic packet is used to turn on a power source of a device corresponding to Wake On LAN, a registered trade name of AMD (Advanced Micro Devices, Inc.).

The plurality of patterns are registered in a MAC ROM 411 and read by the LAN controller 410 at the time of initialization processing. The non all-night power source 416 can be applied to the MAC ROM 411. Further, the patterns registered in the MAC ROM 411 can be set via the operation display unit 408 by the user or set via the network 301 from a remote device (e.g., the host computer 317) to be stored and retained.

FIG. 4 illustrates exemplary contents of a format of the magic packet. In FIG. 4, a destination address field 701 indicates a destination MAC address, and a sender address field 702 indicates a sender MAC address. A type field 703 indicates an upper protocol, and data fields 704 and 705 indicate data specific to the magic packet. In the data field 704, a synchronizing stream "FFFFFFFFFFFF" is entered and in the data field 705, a value which indicates a MAC address of the printer 302 being started, is entered sixteen times successively. A data field 707 is a misc field, and its value and size are variable. A data field 706 is a FCS field (Frame Check Sequence) which indicates a value of a CRC (Cyclic Redundancy Check).

The start packet is not limited to the above format shown in FIG. 4. For example, a packet of a format which has a specific style uniquely designed can be used to realize the start packet. Further, a value indicating the MAC address of the printer 302 being started, can be entered as a broadcast address into the data field 705, and a plurality of printers 302 can be simultaneously started. In this case, the broadcast address can be set to the MAC ROM 411 as a startup condition.

An example of main operation in the image forming system according to this embodiment is described.

Figure 5:
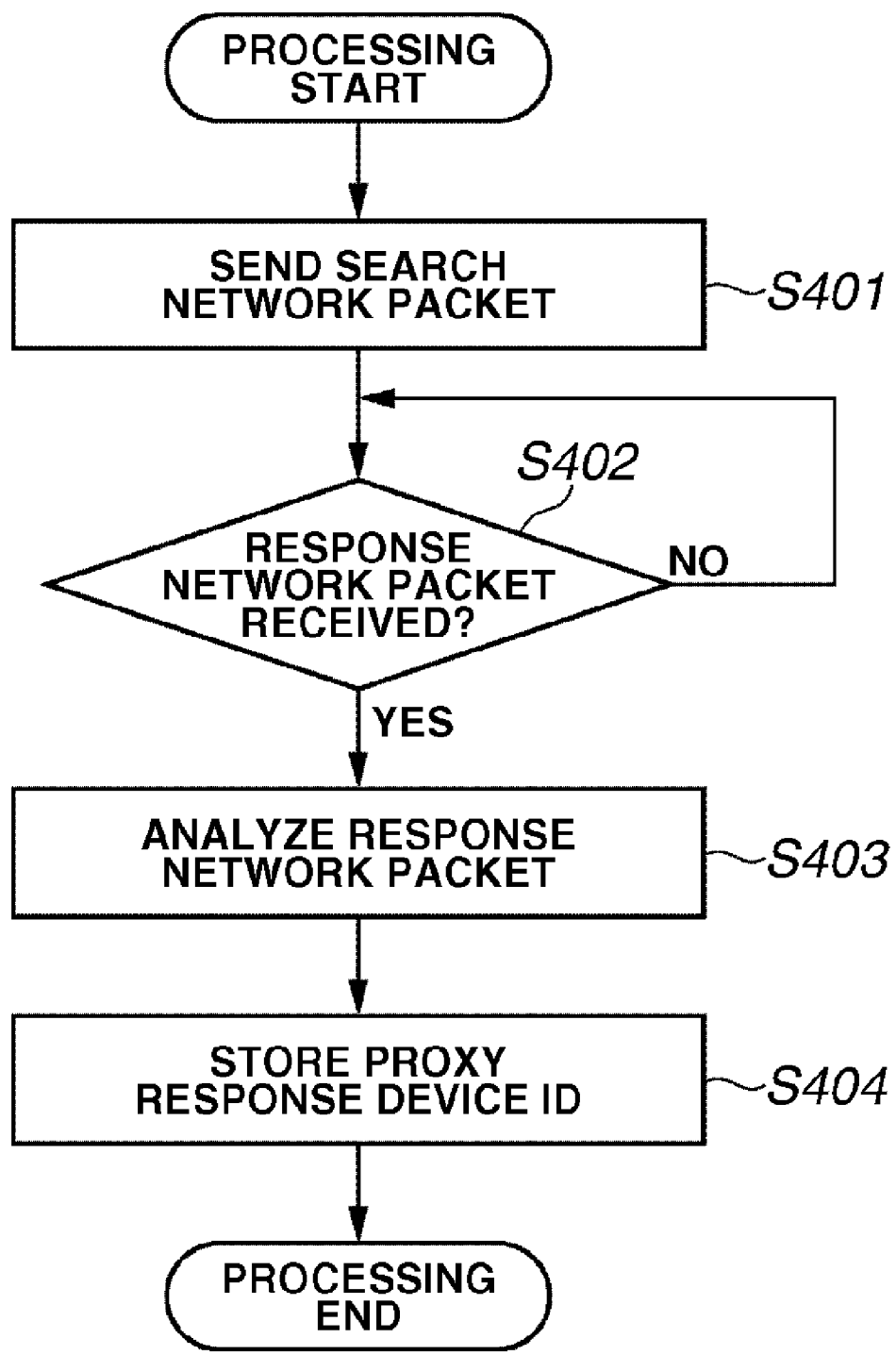
FIG. 5 is a flowchart for explaining an operation of a printer in a case of storing a proxy response device ID according to an exemplary embodiment of the present invention.

FIG. 5 is a flowchart for explaining an exemplary operation of the printer 302 at the time of storing a proxy response device ID. Processing in each step is realized when a CPU (Central Processing Unit) of the device executes a program stored on a nonvolatile storage unit (HDD or ROM). In order to realize processing shown in each step, a part of the processing can be executed by a dedicated hardware and the rest of the processing can be executed in accordance with a program. At step S401 in FIG. 5, for example, when the printer 302 is started, the proxy response device search unit 304 sends a search network packet which includes contents shown in FIG. 6, to the network 301. As for the timing of the search, other than the above-described startup of the printer 302, various timing can be applied, for example, a cycle set to the memory in advance can be applied.

As shown in FIG. 6, in the search network packet, an Ethernet (registered trade name) header, an IP header (destination, sender, or the like), a data type, and an image forming device ID are included. A proxy response device ID is empty. The receiver of the search network packet (that is, a device which outputs) is assumed to be a plurality of server computers 310 connected to the network 301. In this embodiment, as the destination of the Ethernet (registered trade name) header, "ff:ff:ff:ff:ff:ff" is entered. As the sender of the Ethernet (registered trade name) header, for example, the MAC address of the printer 302 which wants to acquire the proxy response device ID, can be considered. Further, other than the MAC address, a device name or a device ID of the printer 302 can be applied if the information can specify the sender.

As the destination of the IP header, a broadcast address (255.255.255.255) is entered which means that a query is issued to a device connected to the network 301. As the sender of the IP header, the IP address of the printer 302 which wants to acquire the proxy response device ID, is entered.

As the data type, "00" which indicates carrying out the search of the proxy server computer 310, is entered. If it is possible to search the proxy server computer 310 at the receiving side, any identification information can be applied. As the image forming device ID, the IP address of the printer 302 which wants to acquire the proxy response device ID, is entered. Although the IP address of the searched proxy server computer 310 should be entered as the proxy response device ID, it is empty as described above because it is before the search is performed. Further, in the search network packet, a Protocol Type, an IP Version, a Header Length, or the like are entered. The search network packet described above is sent to the plurality of devices connected to the network 301.

At step S402, the network interface 303 waits until a response network packet created in any of the proxy server computers 310 is received. The network packet can be sent back from a plurality of proxy server computers 310. In FIG. 7, an example of contents of the response network packet is shown. It is not limited to the proxy server computer 310 that sends a response. If a device can respond notifying the existence of a proxy server computer of a searching device (the response network packet in FIG. 7), arbitrary devices can be used. As shown in FIG. 7, in the response network packet, an Ethernet (registered trade name) header, an IP header (destination, sender, or the like), a data type, an image forming device ID and a proxy response device ID are included. All server computers 310 connected to the network 301 are assumed to receive the search network packet. In this embodiment, as the destination of the Ethernet (registered trade name) header, the MAC address of the printer 302 which wants to acquire the proxy response device ID, is entered. As the sender of the Ethernet (registered trade name) header, the MAC address of the proxy server computer 310 can be considered.

As the destination of the IP header, the IP address of the printer 302 which wants to acquire the proxy response device ID is entered. As the sender of the IP header, the IP address of the proxy server computer 310 is entered.

As the data type, "01" which indicates carrying out the response to the search from the printer 302, is entered. The identification information which indicates that it is the response to the search from the printer 302, is not limited to "01". If it is possible to identify information as the response to the search, any identification information can be applied. As the image forming device ID, the IP address of the printer 302 which wants to acquire the proxy response device ID, is entered. As the proxy response device ID, the IP address of the proxy server computer 310 which is the sender of the response network packet, is entered. Further, in the response network packet, similar to the search network packet, a Protocol Type, an IP Version, a Header Length, or the like are entered.

Then, at step S403, the proxy response device search unit 304 analyzes the response network packet received at step S402. At step S404, the proxy response device search unit 304 extracts the proxy response device ID based on the analysis result obtained at step S403, and stores the extracted proxy response device ID in the proxy response device ID information storage unit 306. As described above, in this embodiment, the proxy response device ID is the IP address of the proxy server computer.

Figure 8:
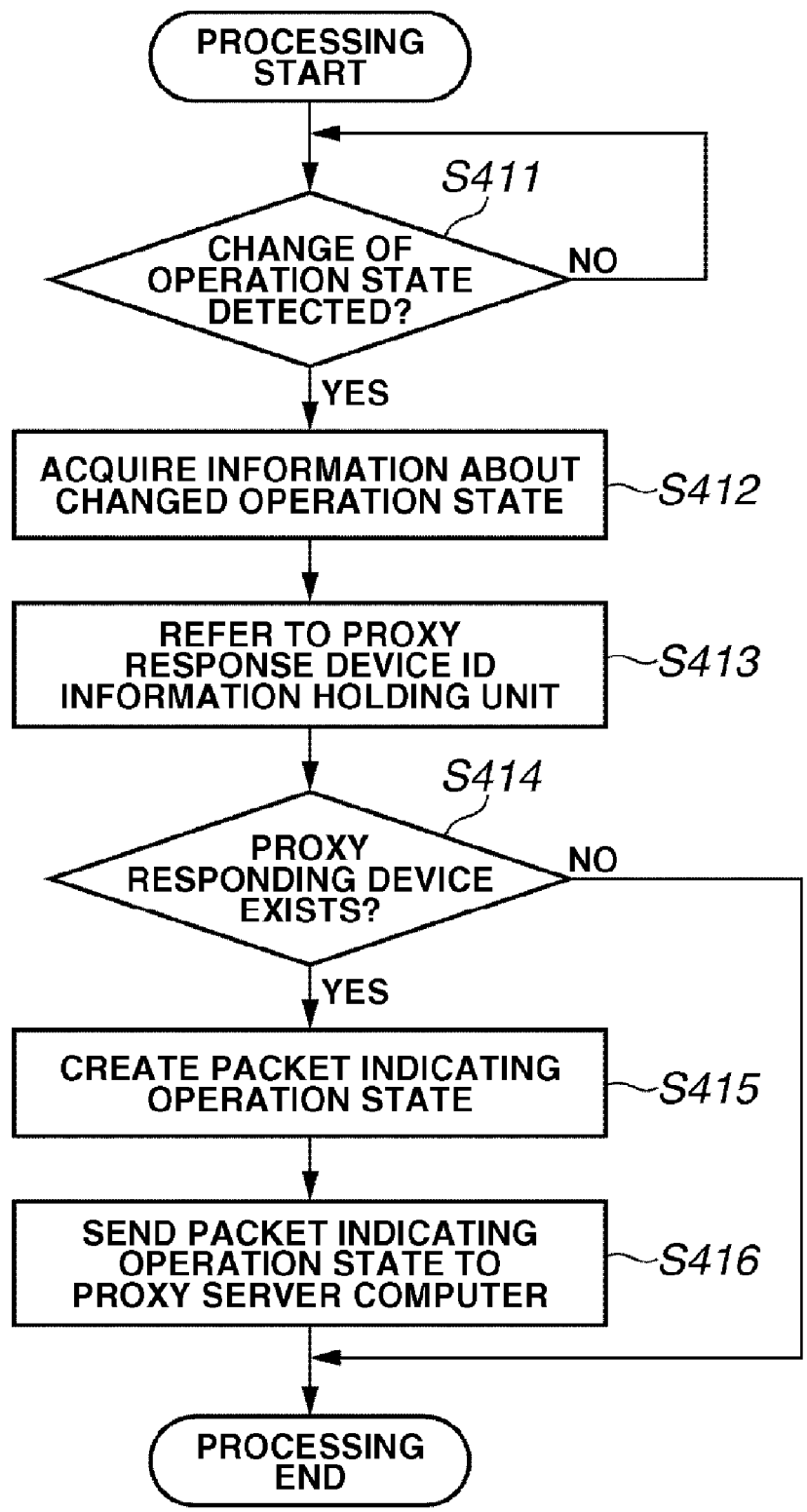
FIG. 8 is a flowchart illustrating an operation of a printer in a case where an operation status is changed according to an exemplary embodiment of the present invention.

FIG. 8 is a flowchart illustrating an exemplary operation of the printer 302 in a case where operation status is changed. Processing in each step is realized when a CPU (Central Processing Unit) of the device executes a program stored on a nonvolatile storage unit (HDD or ROM). In order to realize processing shown in each step, a part of the processing can be executed by a dedicated hardware and the rest of the processing can be executed in accordance with a program. At step S411 in FIG. 8, the operation state management unit 309 determines whether an operation status of the printer 302 has been changed. As a result, if it is determined that the operation status of the printer 302 has been changed ("Yes" in step S411), the processing moves to step S412 in which the operation state transfer unit 308 receives information about the changed operation status from the operation state management unit 309. Then, at step S413, while receiving the information about the operation status created at step S412, the operation state transfer unit 308 refers to the proxy response device ID information storage unit 306.

At step S414, the operation state transfer unit 308 determines whether the proxy server computer 310 which responds by proxy for the printer 302 exists, depending on whether the proxy response device ID stored in the proxy response device ID information storage unit 306 exists. As a result of the determination, if the proxy server computer 310 which responds by proxy for the printer 302 exists ("Yes" in step S414), the processing moves to step S415 in which the operation state transfer unit 308 creates a packet which indicates a first operation status of the printer 302. In FIG. 9, an example of contents of the packet, which indicates the first operation status, is shown. In another example, the printer 302 does not actively notify the packet indicating the operation status as shown in FIG. 9, to the proxy server computer 310, but the printer 302 can notify in response to an information acquisition request from the proxy server computer 310. For example, in a flowchart in FIG. 10 which is described below, processing of the printer 302 is shown, in a case where the operation status acquisition request from the proxy server computer 310 exists.

As shown in FIG. 9, the packet includes information associated with the first operation status, an Ethernet (registered trade name) header, an IP header (destination, sender, etc.), a data type, an image forming device ID, a status number, and a status. In this embodiment, as the destination of the Ethernet (registered trade name) header, the MAC address of the proxy server computer 310, which is determined to exist at step S414, is entered. As the sender of the Ethernet (registered trade name) header, the MAC address of the printer 302 whose operation status has been changed, can be considered.

As the destination of the IP header, the IP address of the proxy server computer 310, which is determined to exist at step S414, is entered. As the sender of the IP header, the IP address of the printer 302, whose operation status has been changed, is entered.

As the data type, "10", which indicates carrying out the notification that the operation status of the printer 302 has been changed, is entered. As the image forming device ID, the IP address of printer 302, whose operation status has been changed, is entered. As the status number, a number of the changed operation status is entered. As the status, specific contents of the changed operation status are numerically expressed and entered. Further, in the packet indicating the first operation status, a Protocol Type, an IP Version, a Header Length, a total number of printed sheets of the printer 302, the number of printed sheet of the printer 302 of the day, current time, or the like are entered.

If the above-described packet which indicates the first operation status is created, at step S416, the network interface 303 sends the packet which indicates the first operation status created in the operation state transfer unit 308, to the proxy server computer 310 which is determined to exist at step S414.

Figure 10:
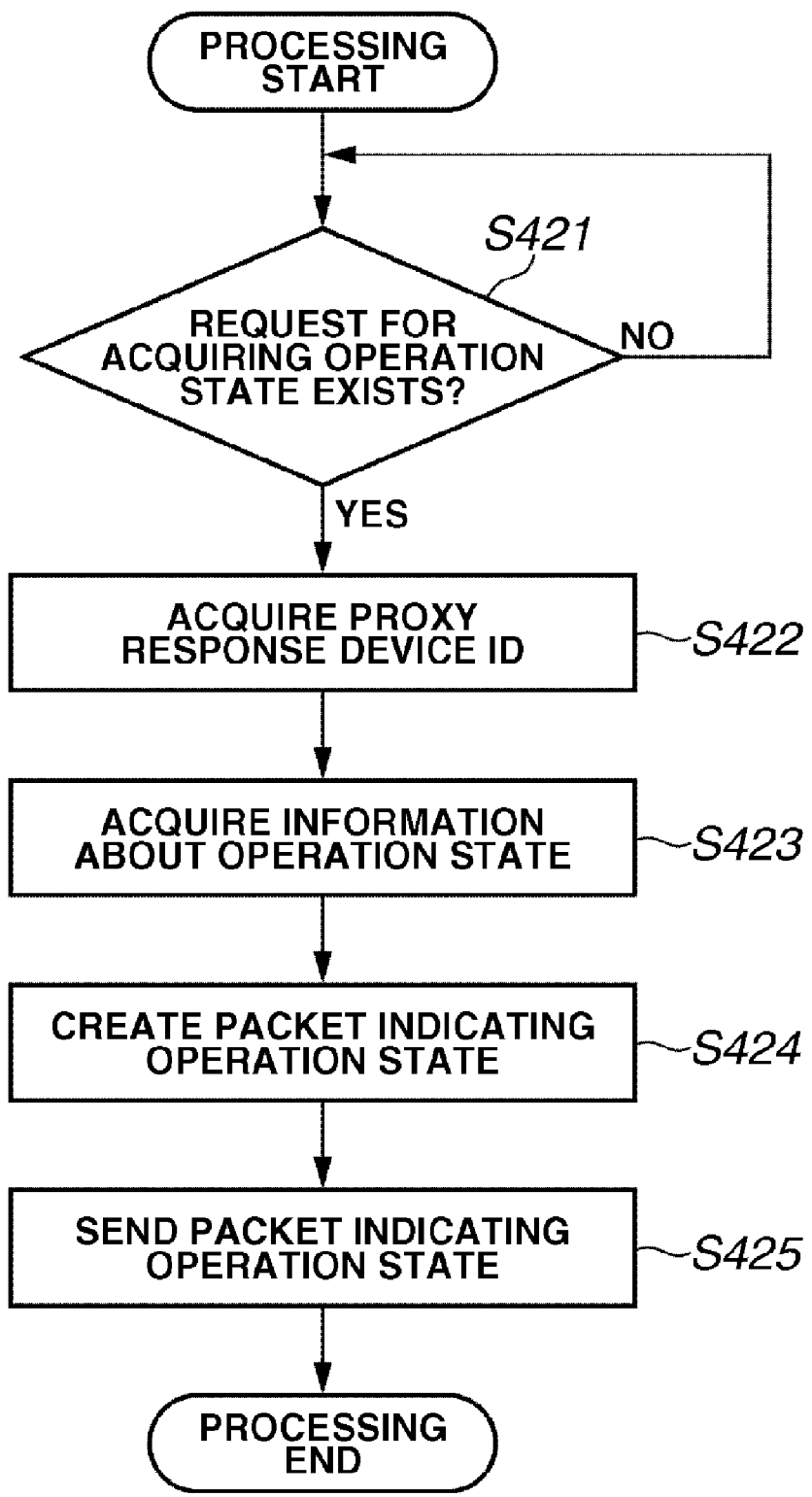
FIG. 10 is a flowchart illustrating an operation of a printer in a case where acquisition of operation status is requested from a host computer or a proxy server computer according to an exemplary embodiment of the present invention.

FIG. 10 is a flowchart illustrating an exemplary operation of the printer 302 in a case where an acquisition of operation status is requested from the host computers 317a to 317c or the proxy server computer 310. Processing in each step is realized when a CPU (Central Processing Unit) of the device executes a program stored in a nonvolatile storage unit (HDD or ROM). In order to realize processing shown in each step, a part of the processing can be executed by a dedicated hardware and the rest of the processing can be executed in accordance with a program. At step S421 in FIG. 10, the network interface 303 waits until a request to acquire an operation status is received from an external device. If the request for acquiring operation status is received, the processing moves to step S422. As the external device, the host computers 317a to 317c or the proxy server computer 310 can be assumed.

At step S422, the operation state transfer unit 308 acquires a proxy response device ID from the proxy response device ID information storage unit 306. Then, at step S423, the operation state transfer unit 308 acquires information about operation status of the printer 302 from the operation state management unit 309. At step S424, based on the proxy response device ID acquired at step S422, and the information about operation status of the printer 302 acquired at step S423, a packet is created which indicates a second operation status. In FIG. 11, an example of contents of the packet is shown which indicates the second operation status. When the packet in FIG. 11 is notified to the host computers 317a to 317c, or the like, the proxy response device ID included in the packet is acquired and stored by the host computer. The proxy response device ID stored here is referred to at step S604 in FIG. 13 which is described below, when it is confirmed whether the proxy response device is registered in the host computer.

As shown in FIG. 11, in the packet which indicates the second operation status, an Ethernet (registered trade name) header, an IP header (destination, sender, or the like), a data type, an image forming device ID, a status number, and a status are included. In this embodiment, as the destination of the Ethernet (registered trade name) header, the MAC address of the host computer 317, which requests the acquisition of the operation status, is entered. As the sender of the Ethernet (registered trade name) header, the MAC address of the printer 302, whose operation status acquisition is requested, can be used.

As the destination of the IP header, the IP address of the host computer 317, which requests the acquisition of the operation status, is entered. As the sender of the IP header, the IP address of the printer 302, whose operation status acquisition is requested, is entered.

As the data type, "11", which indicates carrying out the response to the request of the acquisition of the operation status of the printer 302, is entered. As the image forming device ID, the IP address of the printer 302, whose operation status acquisition is requested, is entered. As the status number, the number of the operation status of the printer 302 whose operation status acquisition is requested is entered. As the status, specific contents of the changed operation status, which are numerically expressed, are entered. Further, in the packet indicating the second operation status, similar to the packet indicating the first operation status, a Protocol Type, an IP Version, a Header Length, a total number of printed sheets of the printer 302, the number of printed sheet of the printer 302 of the day, current time, or the like are entered.

When the above-described packet which indicates the second operation status is created, at step S425, the network interface 303 sends the packet which indicates the second operation status created in the operation state transfer unit 308, to the external device which requested the acquisition of the operation status.

Figure 12:
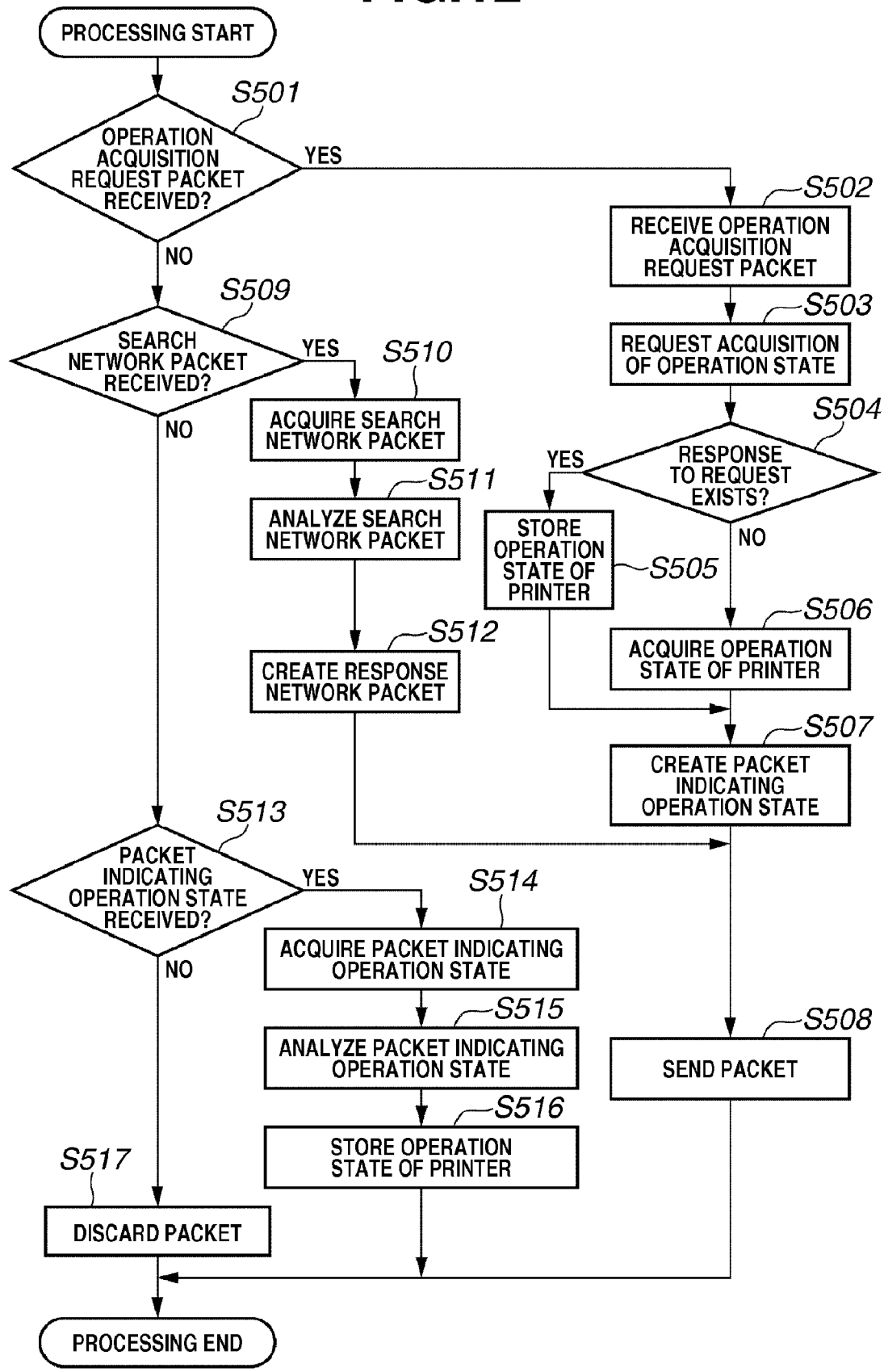
FIG. 12 is a flowchart illustrating an operation of a proxy server computer in a case of creating a response network packet and acquiring an operation status of a printer, and in a case where a request to acquire an operation status of a printer is issued from a host computer, according to an exemplary embodiment of the present invention.

FIG. 12 is a flowchart illustrating an exemplary operation of the proxy server computer 310 in a case where a response network packet is created which includes the contents shown in FIG. 7, and in a case where operation status of the printer 302 is acquired, and in a case where a request to acquire operation status of the printer 302 is issued from the host computer 317. Processing in each step is realized when a CPU (Central Processing Unit) of the device executes a program stored in a nonvolatile storage unit (HDD or ROM). In order to realize processing shown in each step, a part of the processing can be executed by a dedicated hardware and the rest of the processing can be executed in accordance with a program. At step S501 in FIG. 12, the network interface 311 determines whether a packet which indicates a request to acquire an operation status is received from the operation state acquisition unit 319 of the host computer 317. If the operation acquisition request packet is received ("Yes" in step S501), the processing moves to step S502. In the description below, the packet which indicates the request to acquire an operation status is referred to as an operation acquisition request packet.

At step S502, the operation proxy response unit 314 receives the operation acquisition request packet which has been received as determined at step S501. Then, at step S503, the operation state confirmation unit 315 requests to the printer 302 to acquire an operation status. At step S504, the network interface 311 determines whether a response to the request to acquire the operation status is issued from the printer 302, and a packet which indicates the second operation status is received. As a result of the determination, if the response to the request to acquire the operation status is received, and the packet which indicates the second operation status is received, the operation proxy response unit 314, at step S505, extracts information about the operation status of the printer 302 from the packet which indicates the second operation status. Then, the operation proxy response unit 314 stores the extracted information in the operation state storage unit 313.

On the other hand, if the response to the request to acquire the operation status is not received from the printer 302 ("No" in step S504), the processing proceeds to step S506 in which the operation proxy response unit 314 acquires the information about the operation status of the printer 302 stored in the operation state storage unit 313. Then, at step S507, the operation proxy response unit 314 creates a packet which includes the information about the operation status of the printer 302 stored at step S505, or the information about the operation status of the printer 302 acquired at step S506. The packet which indicates the operation status is, for example, similar to the packet which indicates the second operation status shown in FIG. 11. At step S508, the network interface 311 sends the packet which indicates the operation status to the host computer 317 which requested to acquire the operation status. The transmission of the information in the proxy server computers 310a to 310c or the host computers 317a to 317c includes the processing of instruction to send the information to a transmission hardware part, in an operating system running on the device. The processing of instruction to send the information is not electrical information communication processing itself. However, since the processing is software processing that directly relates to the electrical information communication processing, it is included in the processing of the transmission.

At step 501, if it is determined that the operation acquisition request packet has not been received, the processing moves to step S509 in which the network interface 311 determines whether the search network packet shown in FIG. 6 has been received from the printer 302 (proxy response device search unit 304). If the search network packet has been received ("Yes" in step S509), the processing moves to step S510.

At step S510, the search response unit 316 acquires the search network packet which has been received as determined at step S509. Then, at step S511, the search response unit 316 analyzes the search network packet. At step S512, the search response unit 316 switches between the sender and the destination of the search network packet having the contents shown in FIG. 6, and inputs the proxy response device ID of the device itself to create the response network packet of the contents shown in FIG. 7.

Then, at step S508, the network interface 311 sends the response network packet created at step S512 to the printer 302 (i.e., the searcher). Then, the proxy response device search unit 304 of the printer 302 creates a search network packet each time an execution instruction is received, and the above-described processing is repeated. The execution instruction to the proxy response device search unit 304 is periodically carried out according to a system setting (not shown) of the printer 302.

At step S509, if it is determined that the search network packet has not been received, the processing moves to step S513 in which the network interface 311 determines whether the packet which indicates the first operation status shown in FIG. 9 has been received. If it is determined that the packet has been received ("Yes" in step S513), the processing moves to step S514.

At step S514, the operation state acquisition unit 312 acquires the packet which indicates the first operation status. Then, at step S515, the operation information acquisition unit 312 analyzes the packet which indicates the first operation status. At step S516, the operation information acquisition unit 312, based on a result of the analysis of the packet which indicates the first operation status, extracts information about the operation status of the printer 302 and stores the information in the operation state storage unit 313. At step S513, if it is determined that the packet which indicates the first operation status has not been received, the processing moves to step S517 and the received packet is discarded.

Figure 13:
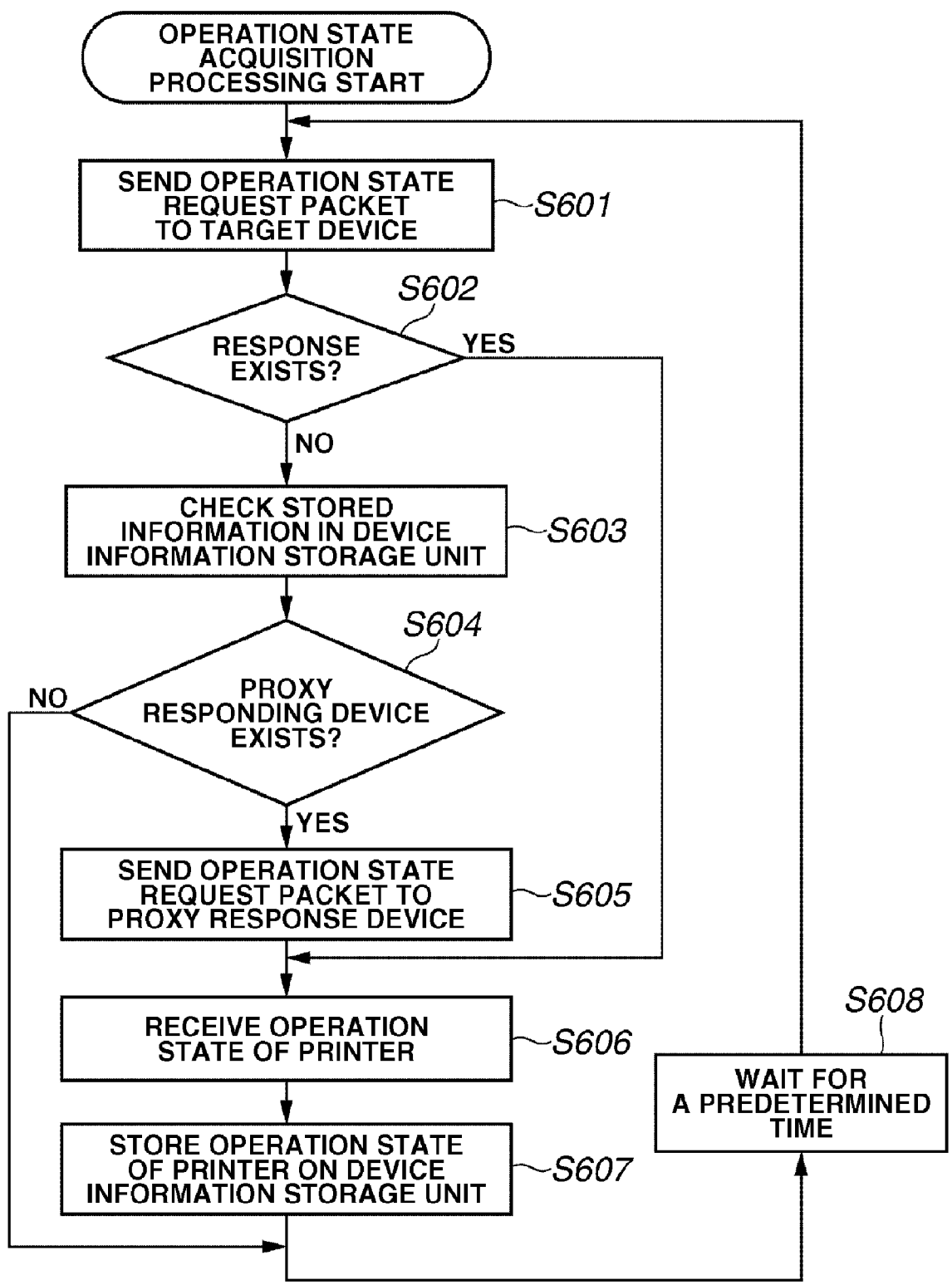
FIG. 13 is a flowchart illustrating an operation of a host computer in a case of acquiring information about operation status of a printer, according to an exemplary embodiment of the present invention.

FIG. 13 is a flowchart illustrating an exemplary operation of the host computer 317 in a case where information about operation status of the printer 302 is acquired. Processing in each step is realized when a CPU (Central Processing Unit) of the device executes a program stored in a nonvolatile storage unit (HDD or ROM). In order to realize processing shown in each step, a part of the processing can be executed by a dedicated hardware and the rest of the processing can be executed in accordance with a program. At step S601 in FIG. 13, the operation state acquisition unit 319 sends an operation status request packet to the printer 302 (i.e., an image forming device). At step S602, it is determined whether a response from the printer 302 exists. As a result, if it is determined that the response exists, at step S606, a packet which indicates the operation status as described in FIG. 11, is received (acquired) as the response to the request at step S601 and stored in the device information storage unit 320.

On the other hand, if it is determined that the response does not exist at step S602, at step S603, the information stored in the device information storage unit 320 is checked. Further, at step S604, it is checked whether proxy response device identification information corresponding to the printer 302 which is the requested image forming device, is stored. In the check processing at step S603, the search network packet described in FIG. 6 can be sent to the network 301 by the host computer 317, as a response to the sent search network packet, the response network packet described in FIG. 7 is received by the host computer 317, and the received response network packet can be checked by the host computer 317. In a case where the host computer 317 searches for a proxy server computer, the information such as the "Ethernet (registered trade name) Header Sender", "IP Header Sender", "Image forming device ID", or the like in FIG. 6 can be the information of the host computer. In a case where the host computer searches for the proxy server computer, the search can be performed in timing corresponding to an instruction from a user, or in periodic timing, or in timing corresponding to start-up of a search application. Further, the proxy server computer ID can be acquired and stored at the time of acquiring the above-described packet in FIG. 11. At step S604, if it is determined that the proxy response device identification information corresponding to the printer 302 which is the requested image forming device, is not stored, the processing is returned to step S601 and processing after step S601 is repeated.

At step 604, if it is determined that the proxy response device identification information corresponding to the printer 302 (i.e., the requested image forming device) is stored (YES at step S604), information about the image forming device is acquired from the proxy response device. More specifically, at step S605, based on the proxy response device identification information acquired by the processing at step S603, an operation status request packet is sent to the proxy response device. Then, at step S606, a response corresponding to the transmission of the operation status request packet carried out at step S605, is received.

At step S607, from the response received at step S605, information about the operation status of the printer 302 is extracted and stored in the device information storage unit 320. Then, at step S608, after waiting a predetermined time (for example, 10 minutes), the processing of the transition to step S601 is repeated.

As described above, in this embodiment, the host computer 317 can efficiently acquire the information about the printer 302 from the proxy server computer 310 even if the printer 302 cannot give a response. For example, even if the printer 302 shifts to the deep sleep mode and cannot carry out network communication other than communication of a specific pattern data, the host computer 317 can acquire the information about the printer 302. As the information about the printer 302, for example, the host computer 317 can acquire a remaining amount of toner, a total number of printed sheets, or a size of printable sheet even if the host computer 317 can not communicate with the printer 302. As described above, the information of the printer 302 includes all information about the printer 302. The information about the printer 302 is not limited to the operation status of the printer, but can be static information described in FIG. 2. The static information can be, for example, notified to the proxy server computer at the time of starting the printer, or periodically. The method for acquiring the static information of the image forming device by the host computers 317a to 317c is similar to the acquisition method of the operation status information by the printer.

Further, the printer 302 searches at the time of starting the proxy server computer 310 which makes a response to notify the operation status of the printer 302 by proxy. Accordingly, the proxy server computer 310, which makes the response to notify the operation status of the printer 302 by proxy, can be searched at early stage. Further, a schedule to which the printer 302 periodically issues the operation status to the proxy server computer 310 is not necessary. In addition, each time the operation status of the printer 302 changes, the printer 302 itself notifies the changed status to the proxy server computer 310, which makes a response to notify the operation status by proxy. Therefore, the host computer 317 can acquire a new operation status as early as possible from the proxy server computer 310.

The proxy server computer 310, before responding by proxy, requests to acquire an operation status of the printer 302, and if the operation status can be acquired, notifies the operation status to the host computer 317. Accordingly, after presence or non-presence is detected, newer operation status can be acquired from the proxy server computer 310.

In this embodiment, as the proxy response device ID (proxy response device identification information), an IP address is used, however, a FQDN (Fully Qualified Domain Name), a host name, or the like can also be used. Further, as shown in FIG. 11, in this embodiment, the host computer 317 and the proxy server computer 310 acquire a proxy response device ID together with an operation status of the printer 302. However, the timing of acquiring the proxy response device ID can be differentiated from the timing of acquiring the operation status of the printer 302. Even in such configuration, the function in which the host computer 317 queries the proxy server computer 310 about an operation status of the printer 302, still remains intact. In this case, the identification information transfer unit 307 shown in FIG. 2 functions to return the proxy response device ID.

Further, in this embodiment, the printer 302 searches for the proxy server computer 310 which makes a response by proxy for the printer 302 itself. However, it is also possible for the proxy server computer 310 itself to register to the printer 302 that it is the device to makes a response by proxy for the printer 302 (proxy response device ID). Thus, the processing in which the printer 302 searches for the proxy server computer 310, and the communication load on the network 301, can be reduced.

Further, the printer 302 itself can be provided with a user interface to input a proxy response device ID, and a recording medium to store the input proxy response device ID so that the function of registering the device which makes a response by proxy for the printer 302, can be realized. Thus, the processing in which the printer 302 searches for the proxy server computer 310, and the processing in which the proxy server computer 310 registers the proxy response device ID to the printer 302, can be both avoided.

Further, in this embodiment, each time the operation status of the printer 302 changes, the changed operation status is notified to the proxy server computer 310. However, it is possible to notify the operation status to the proxy server computer 310 only in a case where the printer 302 shifts to a specific operation status. In this case, for example, the operation state transfer unit 308 determines a condition which should be notified, and only in a case where such condition is satisfied, the operation status can be sent to the proxy server computer 310. For example, just before the printer 302 shifts to the power-saving mode, the operation status is transferred to the proxy server computer 310 to register the operation status in the proxy server computer 310 as the status that should be responded by proxy. Thus, the number of transfer of the operation status can be reduced and the status that should be responded by proxy, can be clarified.

Further, it is also possible that the printer 302 regularly searches for the proxy server computer 310 which makes a response to notify the operation status of the printer 302 by proxy. Thus, even if a power source of a proxy server computer 310 is shut off, the other proxy server computers 310 can notify the operation status of the printer 302 by proxy. Further, the proxy server computer 310 can periodically acquire the operation status from the printer 302.

In order to operate each device to realize the above-described functions in the embodiments, a program code of software that implements the functions of the embodiments, can be provided to a device or a computer in the system which is connected to each device, and according to the program stored on the computer (CPU or MPU) in the system or the device, each device is operated. Such case is included in the scope of the present invention In this case, the program code of the software itself implements the functions of the embodiments described above, and accordingly, the program code itself, and the unit adapted to provide the program code to the computer, for example, a recording medium storing the program code constitutes the present invention. The recording medium for storing such program code can be, for example, a flexible disk, a hard disk, an optical disk, a magneto-optical disk, a CD-ROM, a magnetic tape, a nonvolatile memory card, and a ROM.

In addition, in another aspect of the present invention, the functions according to the embodiments described above can be implemented not only by executing the provided program code by the computer, but also can be implemented by an OS (operating system) or another application software operating on the computer in combination with the program code. Also in such case, the program code is included in the scope of the present invention Further, in another aspect of the present invention, after the provided program code is stored in a function enhancing board of the computer or a memory which is provided in a function enhancing unit connected to the computer, according to the instruction of the program code, the CPU or the like provided in the function enhancing board or the function enhancing unit carries out a part of or the whole of the processing to implement the functions of the above-described embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application 2005-287592 filed on Sep. 30, 2005, which is hereby incorporated by reference herein in its entirety.

What is claimed is:

1. An information processing apparatus that communicates with an image forming apparatus, the information processing apparatus comprising:
   a first request unit configured to request an operation state information about the image forming apparatus to the image forming apparatus;
   a receiving unit configured to receive the information from the image forming apparatus, the information including the operation state information about the image forming apparatus and a proxy response device identification information which identifies a proxy response device remote from the image forming apparatus;
   an extracting unit configured to extract and store the proxy response device identification information included in a response of the image forming apparatus corresponding to the request from the first request unit, in a case where the image forming apparatus normally responds to the request from the first request unit; and
   a second request unit configured to request the information about the image forming apparatus to the proxy response device identified by the proxy response device identification information stored by the extracting unit, in a case where the image forming apparatus does not respond to the request from the first request unit,
   wherein the proxy device receives the information about the image forming apparatus from the image forming apparatus when the image forming apparatus can respond to the request,
   and the proxy device responds to the request from the image processing apparatus when the image forming apparatus cannot respond to the request.

2. The information processing apparatus according to claim 1, wherein, in response to the request from the first request unit, the image forming apparatus searches for the proxy response device, and notifies a searched result to the information processing apparatus.

3. The information processing apparatus according to claim 1, further comprising:
   a search unit configured to search for the proxy response device identification information from the network,
   wherein the setting unit sets the proxy response device identification information retrieved during search by the search unit.

4. The information processing apparatus according to claim 1, further comprising:
   a determination unit configured to determine whether the proxy response device identification information is set by the setting unit;
   wherein the second request unit requests the information about the image forming apparatus to the proxy response device identified by the proxy response device identification information determined by the determination unit to have been set, in a case where the response corresponding to the request from the first request unit is not received from the image forming apparatus.

5. A method of acquiring information about an image forming apparatus by an information processing apparatus, the method including:
   requesting an operation state information about the image forming apparatus to the image forming apparatus;
   receiving the information from the image forming apparatus, the information including the operation state information about the image forming apparatus and a proxy response device identification information which identifies a proxy response device remote from the image forming apparatus;
   extracting and storing the proxy response device identification information included in a response of the image forming apparatus corresponding to the request from the first request unit, in a case where the image forming apparatus normally responds to the request from the first request unit; and
   requesting the information about the image forming apparatus to the proxy response device identified by the proxy response device identification information stored by the extracting unit, in a case where the image forming apparatus does not respond to the request from the first request unit,
   wherein the proxy device receives the information about the image forming apparatus from the image forming apparatus when the image forming apparatus can respond to the request,
   and the proxy device responds to the request from the image processing apparatus when the image forming apparatus cannot respond to the request.

6. The method according to claim 5, wherein the image forming apparatus searches for the proxy response device, and notifies the searched result to the information processing apparatus.

7. The method according to claim 5, further including:
   searching the proxy response device identification information from the network,
   wherein the setting comprises setting the proxy response device identification information retrieved during the searching.

8. The method according to claim 5, further including:
   determining whether the proxy response device identification information is set;
   wherein the second request comprises requesting the information about the image forming apparatus to the proxy response device identified by the proxy response device identification information determined to have been set, in a case where the response corresponding to the first request is not received from the image forming apparatus.

9. A non-transitory computer-readable storage medium storing instructions which, when executed by a computer, causes the computer to perform operations comprising:
   generating a request to obtain an operation state information associated with an image forming apparatus;
   receiving the information associated with the image forming apparatus from the proxy response device identified by the proxy response device identification information which identifies a proxy response device remote from the image remote from the image forming apparatus;
   extracting and storing the proxy response device identification information included in a response of the image forming apparatus corresponding to the request from the first request unit, in a case where the image forming apparatus normally responds to the request from the first request unit; and
   requesting the information about the image forming apparatus to the proxy response device identified by the proxy response device identification information stored by the extracting unit, in a case where the image forming apparatus does not respond to the request from the first request unit,
   wherein the proxy device receives the information about the image forming apparatus from the image forming apparatus when the image forming apparatus can respond to the request,
   and the proxy device responds to the request from the image processing apparatus when the image forming apparatus cannot respond to the request.

10. The non-transitory computer-readable storage medium according to claim 9, wherein the information associated with the image forming apparatus is received from the proxy response device if the response corresponding to the first request is not received within a defined time period from the image forming apparatus.

11. The non-transitory computer-readable storage medium according to claim 9, wherein the proxy response device identification information is received in response to the request transmitted to the image forming apparatus.

* * * * *